(12) United States Patent
Powell et al.

(10) Patent No.: US 8,449,030 B2
(45) Date of Patent: May 28, 2013

(54) CHILD SAFETY SEAT WITH SIDE IMPACT PROTECTION

(75) Inventors: Iain Powell, Hampshire (GB); David Shaun Carine, Hampshire (GB); Richard Arthur Moon, Hampshire (GB); Andrew Anthony Whiteway, Hampshire (GB)

(73) Assignee: Britax Römer Kindersicherheit GmbH, Ulm (DE)

( * ) Notice: Subject to any disclaimer, the term of this patent is extended or adjusted under 35 U.S.C. 154(b) by 167 days.

(21) Appl. No.: 12/829,109

(22) Filed: Jul. 1, 2010

(65) Prior Publication Data

US 2011/0012398 A1 Jan. 20, 2011

(30) Foreign Application Priority Data

Jul. 14, 2009 (EP) ..................................... 09009160

(51) Int. Cl.
*B60N 2/26* (2006.01)
*B60N 2/42* (2006.01)
*A47D 1/10* (2006.01)

(52) U.S. Cl.
USPC ...................................................... 297/216.11

(58) Field of Classification Search
USPC ...................................................... 297/216.11
See application file for complete search history.

(56) References Cited

U.S. PATENT DOCUMENTS

| | | | |
|---|---|---|---|
| 4,047,755 A * | 9/1977 | McDonald et al. | 297/216.11 |
| 4,402,548 A * | 9/1983 | Mason | 297/216.11 X |
| 4,436,341 A * | 3/1984 | Converse | 297/216.11 X |
| 5,395,154 A | 3/1995 | Wang | |
| 5,538,322 A * | 7/1996 | Cone et al. | 297/216.11 X |
| 5,716,095 A * | 2/1998 | Lopez | 297/216.11 X |
| 5,733,003 A * | 3/1998 | Goor | 297/216.11 X |
| 5,765,893 A * | 6/1998 | Ziegler | 297/216.11 X |
| 5,829,829 A | 11/1998 | Celestina-Krevh | |
| 6,045,183 A | 4/2000 | Weber | |
| 6,386,632 B1 * | 5/2002 | Goor et al. | 297/216.11 |
| 6,439,660 B1 * | 8/2002 | Guenther | 297/216.11 |
| 6,454,350 B1 * | 9/2002 | Celestina-Krevh et al. | 297/216.11 |
| 6,485,101 B2 * | 11/2002 | Kassai et al. | 297/216.11 X |

(Continued)

FOREIGN PATENT DOCUMENTS

DE 197 22 095 C1 12/1998
DE 102 58 245 A1 6/2004

(Continued)

OTHER PUBLICATIONS

International Search Report from International Patent Application No. PCT/US2008/086392, mailed Mar. 8, 2010.

*Primary Examiner* — Rodney B White
(74) *Attorney, Agent, or Firm* — Alston & Bird LLP

(57) ABSTRACT

Child safety seats are used for the safe transport of children in vehicles. The child safety seats known from prior art often offer only insufficient protection in the case of a side impact. It is therefore an object of the present invention to provide a child safety seat that improves the protective effect of the child safety seat in the case of a side impact. This object is solved by a child safety seat with side impact protection according to the invention. Such a child safety seat comprises at least one element absorbing and/or transmitting energy which is arranged and designed to be transferred from a rest position to a functioning position to absorb a laterally impacting energy in the functioning position.

19 Claims, 8 Drawing Sheets

U.S. PATENT DOCUMENTS

Figure 1:
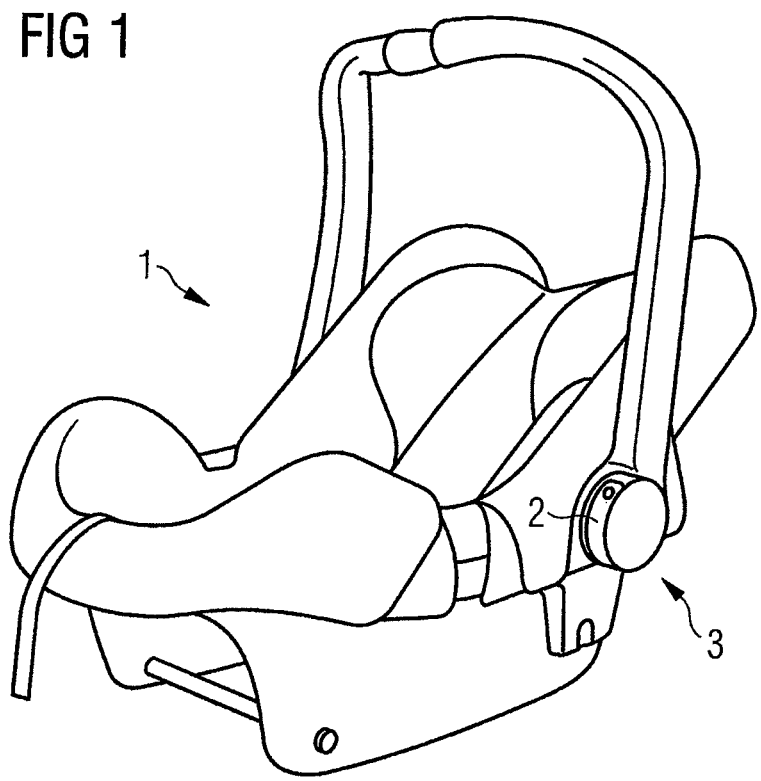

| | | |
|---|---|---|
| 7,125,073 B2 | 10/2006 | Yoshida |
| 7,232,182 B2 | 6/2007 | Yoshida |
| 7,234,771 B2 | 6/2007 | Nakhla |
| 7,488,034 B2 * | 2/2009 | Ohren et al. ............. 297/216.11 |
| 7,717,506 B2 * | 5/2010 | Amesar et al. ........... 297/216.11 |
| 7,726,734 B2 * | 6/2010 | Mahal et al. ............. 297/216.11 |
| 7,740,313 B1 * | 6/2010 | Hei et al. ............. 297/216.11 X |
| 2002/0175544 A1 * | 11/2002 | Goor et al. ................ 297/216.11 |
| 2005/0275554 A1 * | 12/2005 | Patterson et al. .... 297/216.11 X |
| 2008/0079293 A1 * | 4/2008 | Hedges et al. ........... 297/216.11 |
| 2009/0152913 A1 | 6/2009 | Amesar et al. |
| 2010/0019554 A1 * | 1/2010 | Mahal et al. ............. 297/216.11 |
| 2010/0194158 A1 * | 8/2010 | Mahal et al. ............. 297/216.11 |
| 2011/0254331 A1 * | 10/2011 | Nagelski et al. ......... 297/216.11 |

FOREIGN PATENT DOCUMENTS

| | | |
|---|---|---|
| EP | 0 919 427 A2 | 6/1999 |
| EP | 0 931 694 A2 | 7/1999 |
| EP | 1 486 384 A2 | 12/2004 |
| WO | WO 91/19623 A1 | 12/1991 |
| WO | WO 2009/076514 A2 | 6/2009 |
| WO | WO 2009/076514 A3 | 6/2009 |

* cited by examiner

CHILD SAFETY SEAT WITH SIDE IMPACT PROTECTION

CROSS-REFERENCE TO RELATED APPLICATIONS

This application claims priority to European Patent Application No. 09009160.4, filed Jul. 14, 2009, which is hereby incorporated herein in its entirety by reference.

The subject matter of the present invention is a child safety seat with side impact protection.

From prior art, child safety seats for the safe transport of children in vehicles have been known long since. Usually, such child safety seats are fastened to one of the seats of a vehicle. In so doing, they are either fixed by a safety belt or anchored on the vehicle seat by means of a particular fastening mechanism.

In both cases, the relative movement of the child safety seat with respect to the vehicle seat is to be minimised by the fastening. In the case of a heavy acceleration or deceleration of the vehicle, such a movement may nevertheless occur.

In the case of a heavy braking process or the impact of the vehicle on an obstacle in longitudinal direction of the vehicle, the child safety seat may consequently, as compared to the vehicle, be decelerated in a delayed manner, so that the child safety seat is displaced on the vehicle seat in driving direction.

As a rule, the child safety seat is arranged in the vehicle such that it will not hit on an obstacle in the interior of the vehicle during this displacement movement. Correspondingly, the relative movement of the seat in longitudinal direction of the vehicle is thus usually decelerated and restricted by the seat fastening means.

Fundamentally different is the situation in the case of a relative movement of the child safety seat in transverse direction of the vehicle. Such a movement may, for instance, be caused by the impact of another vehicle on the side of the vehicle in transverse direction of the vehicle. Since the child safety seat is usually arranged on one of the side seats of the vehicle, it regularly has a minor lateral distance to the inner side of the vehicle. This distance is, as a rule, not sufficient to sufficiently decelerate the relative movement of the child safety seat by means of the seat fastening means prior to an impact of the child safety seat on the inner side of the vehicle.

In the case of a side impact on the vehicle comprising the child safety seat there will hence be the danger that the child safety seat hits on the inner side of the vehicle at a speed that is not unsubstantial. In the case of this side impact the lateral movement of the child safety seat is stopped within very short time, which corresponds to a strong deceleration. This deceleration in turn causes a substantial force on the child in the child safety seat by which the child may be strongly injured.

Similar injuries of the child may be caused by an impact of objects on the child safety seat in lateral direction. These may, for instance, be pieces of luggage that are taken along in the vehicle, or else another child safety seat. By the impulse transfer from the moving object to the child safety seat which is related with such an impact, the child safety seat is accelerated. The effect of this is, similar as described above, again a force on the child safety seat which potentially endangers the child.

A side impact of the child safety seat on an obstacle or of an object on the child safety seat therefore carries substantial danger of injury for the child transported in the child safety seat.

It is therefore an object of the present invention to provide a child safety seat that improves the protective effect of the child safety seat in the case of a side impact of various kinds.

This object is solved by the child safety seat with side impact protection in accordance with the invention with the features of claim 1. Advantageous further developments of the present invention are indicated in sub claims 2 to 14.

The child safety seat with side impact protection according to the invention comprises at least one element absorbing and/or transmitting energy which is arranged and designed to be transferred from a rest position to a functioning position to absorb a laterally impacting energy in the functioning position.

The child safety seat may particularly be designed in the form of an infant carrier comprising a carrying handle. The element absorbing and/or transmitting energy will then expediently be arranged at this carrying handle. In accordance with the invention it may, however, also be arranged in other regions of the child safety seat, in particular in the lower side region.

Advantageously, the element absorbing and/or transmitting energy is pivotally mounted and is designed in an arc-shaped manner. By a pivotal movement the element absorbing and/or transmitting energy is transferred from the rest position to the functioning position and vice versa.

In another preferred embodiment of the present invention, the element absorbing and/or transmitting energy has the shape of a folding band. In the rest position, the folding band is substantially stretched and is transferred to the functioning position by shortening the distance of its ends.

In a further preferred embodiment of the present invention the element absorbing and/or transmitting energy is designed to be substantially cylinder-shaped, wherein the transfer between the rest position and the functioning position is advantageously performed by means of a winding.

In accordance with the invention the child safety seat may be designed such that the element absorbing and/or transmitting energy is, when the child safety seat is positioned at its destination, preferably the seat of a vehicle, to be transferred manually from the rest position to the functioning position. Correspondingly, the element absorbing and/or transmitting energy may be transferred manually from the functioning position to the rest position when the child safety seat is removed from its destination. In accordance with the invention it is also possible that the transfer to the functioning position is not performed.

In accordance with the invention the child safety seat may also be designed such that the element absorbing and/or transmitting energy is automatically transferred from the rest position to the functioning position when the child safety seat is positioned at its destination. Likewise, the element absorbing and/or transmitting energy is advantageously transferred automatically from the functioning position to the rest position when the child safety seat is removed from its destination.

A child safety seat with side impact protection according to the invention may comprise a plurality of elements absorbing and/or transmitting energy. By the fact that these are designed to be transferred between a rest position and a functioning position it is ensured that the side impact protection is put into practice without a noteworthy permanent increase of the dimensions of the child safety seat above all in lateral direction. This is particularly advantageous since the child safety seat is possibly also to be used outside the vehicle where a compact appearance of the child safety seat is especially desirable. Also inside the vehicle a minimisation of the space utilised by the child safety seat is aimed for so as to avoid, for instance, disturbances of a possible seat neighbour or an unnecessary reduction of the loading space. Therefore, it may be advantageous according to the invention to bring, from a plurality of elements absorbing and/or transmitting energy, only particular elements absorbing and/or transmitting energy into the functioning position in the vehicle, and to leave the remaining elements absorbing and/or transmitting energy in the rest position.

The transferring of the elements absorbing and/or transmitting energy between the rest position and the functioning position may either be performed manually or automatically, or else as a combination of these two possibilities.

If it is performed manually, the user of the child safety seat has to take care himself/herself that the desired elements absorbing and/or transmitting energy are brought to the functioning position when the child safety seat is positioned in a vehicle. If an improved side impact protection is no longer necessary or desired, the elements absorbing and/or transmitting energy may be returned to the rest position again.

In order to increase the comfort of use of the child safety seat or to avoid a maloperation, means may be provided which take care that in particular specific elements absorbing and/or transmitting energy are transferred from the rest position to the functioning position when the child safety seat is positioned at its destination, for instance, the seat of a vehicle. Correspondingly, care may be taken that the elements absorbing and/or transmitting energy are brought to the rest position when the child safety seat is removed from its destination.

Such means may in particular be mechanical or electric means. Thus, the elements absorbing and/or transmitting energy might be transferred to the functioning position, for instance, via a toothed rack drive or via a lever drive when the child safety seat is fastened. It is also conceivable that a contact is closed on fastening of the child safety seat, so that, for instance, an electromagnet is activated which initiates the transfer of the elements absorbing and/or transmitting energy to the functioning position. An electric motor adjusting the elements absorbing and/or transmitting energy might also be activated via the contact.

If the child safety seat at its destination is anchored in a base element into which it is, for instance, pressed, put, or shifted, this pressing, putting, or shifting may be used to bring the elements absorbing and/or transmitting energy into the functioning position via the means described in the last paragraph.

Even if the child safety seat is not anchored in a base element, but fastened on a vehicle seat, for instance, with a safety belt, corresponding means can be used. In particular, the pressure exerted on the child safety seat by the safety belt could be used to bring the elements absorbing and/or transmitting energy into the functioning position.

In an advantageous further development of the present invention, the child safety seat is equipped with sensors. These sensors may, for instance, be suited to initiate the transfer of elements absorbing and/or transmitting energy to different positions as a function of particular parameters.

The sensors could, for instance, be adapted to detect that and at which place the child safety seat is positioned in a vehicle so as to thus initiate the transfer of particular elements absorbing and/or transmitting energy to the functioning position. Likewise, sensors are conceivable which detect accelerations of the child safety seat in particular in lateral direction, so that the elements absorbing and/or transmitting energy are brought into the functioning position only once these accelerations exceed particular threshold values. It is also conceivable that the elements absorbing and/or transmitting energy are returned to the rest position once the threshold values are under-run.

The design and arrangement of the elements absorbing and/or transmitting energy is decisive for the side impact protection of a child safety seat according to the invention.

One object of these elements is to decelerate an undesired lateral movement, for instance, an absolute movement of the child safety seat or a relative movement of an object toward the child safety seat. To this end, the elements absorbing and/or transmitting energy withdraw kinetic energy from this movement in that the elements absorbing and/or transmitting energy absorb it and convert it to some other form of energy, for instance, heat.

Another object of the elements absorbing and/or transmitting energy is to introduce forces acting laterally on the child safety seat into supporting elements or to transmit kinetic energy from a lateral movement to such elements, respectively. In accordance with the invention, the energy to be transmitted is transmitted by the elements absorbing and/or transmitting energy to the child safety seat or the base element, and finally transferred to the car body structure via non-positive and/or positive elements.

Such an element absorbing and/or transmitting energy therefore has to be designed such that it is suited to absorb kinetic energy and to convert it to some other form of energy or to transmit it to supporting elements (e.g. ISOFIX® anchoring and car body).

Expediently the element absorbing and/or transmitting energy is designed such that it converts kinetic energy to heat preferably by plastic deformation or by friction. In the case of a movement of the child safety seat in lateral direction toward an object it is important to decelerate this movement as smoothly as possible so as to avoid too heavy a deceleration of the child safety seat. Therefore, it has to be ensured for this case that the absorption of the kinetic energy takes place sufficiently slowly. For the case of a movement of an object toward the child safety seat, the speed of the energy absorption is quite negligible. In practice, however, there will usually exist an interaction of these two movements, i.e. a movement of the child safety seat in the direction toward an object (for instance, the inner side of a vehicle door), and a movement of an object toward the child safety seat. Therefore, it will basically be of advantage to pay attention to the speed of energy absorption when designing the elements absorbing and/or transmitting energy.

If the element absorbing and/or transmitting energy is intended to transmit kinetic energy predominantly to a supporting element, it will have to be designed such that it does not deform significantly in the case of a side impact. To this end, a suitable material has to be chosen for the element absorbing and/or transmitting energy. This may, for instance, be a conventional thermoplastic material, carbon fibre reinforced plastics, alloys, or a combination thereof.

To ensure the conversion or transmission of the kinetic energy it is expedient that the element absorbing and/or transmitting energy is positioned at a suitable place at the child safety seat. If the child safety seat is anchored in a base element at its destination, it may be advantageous in accordance with the invention to provide elements absorbing and/or transmitting energy at this base element, too. The arrangement of the elements absorbing and/or transmitting energy would be performed in a way similar as with the embodiments explained in detail in the following.

Transport devices for mammals, in particular for dogs or cats, or for other small animals or pets are also considered to be child safety seats as defined by the present invention. A side impact protection according to the invention may increase the safety of such a transport device significantly.

Except in a vehicle, a child safety seat according to the invention may also be used in other transport means such as in trains, in planes, on a boat, on a bicycle, or on a perambulator frame, and prove its advantages there.

Figure 2:
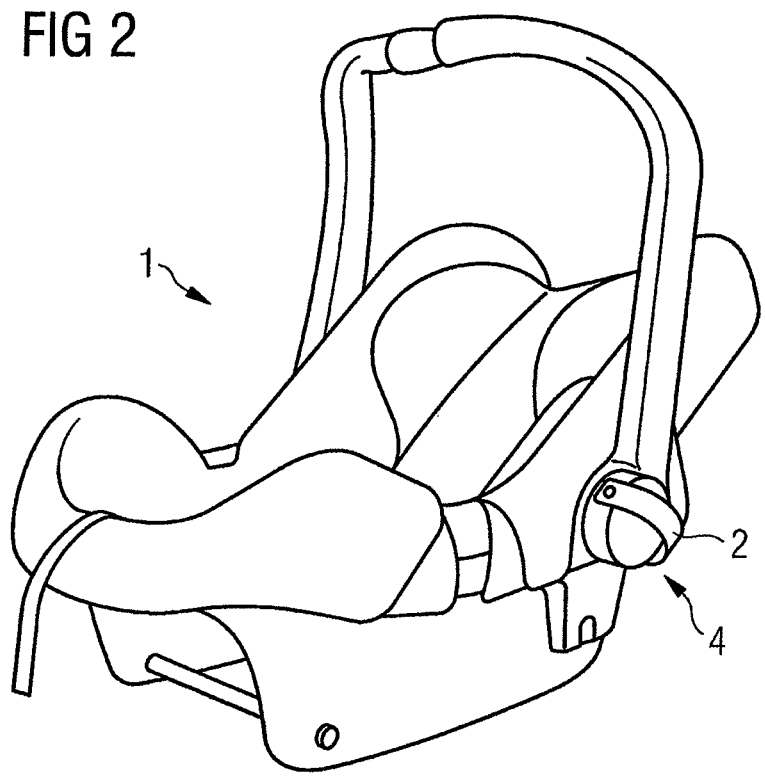
Figure 3:
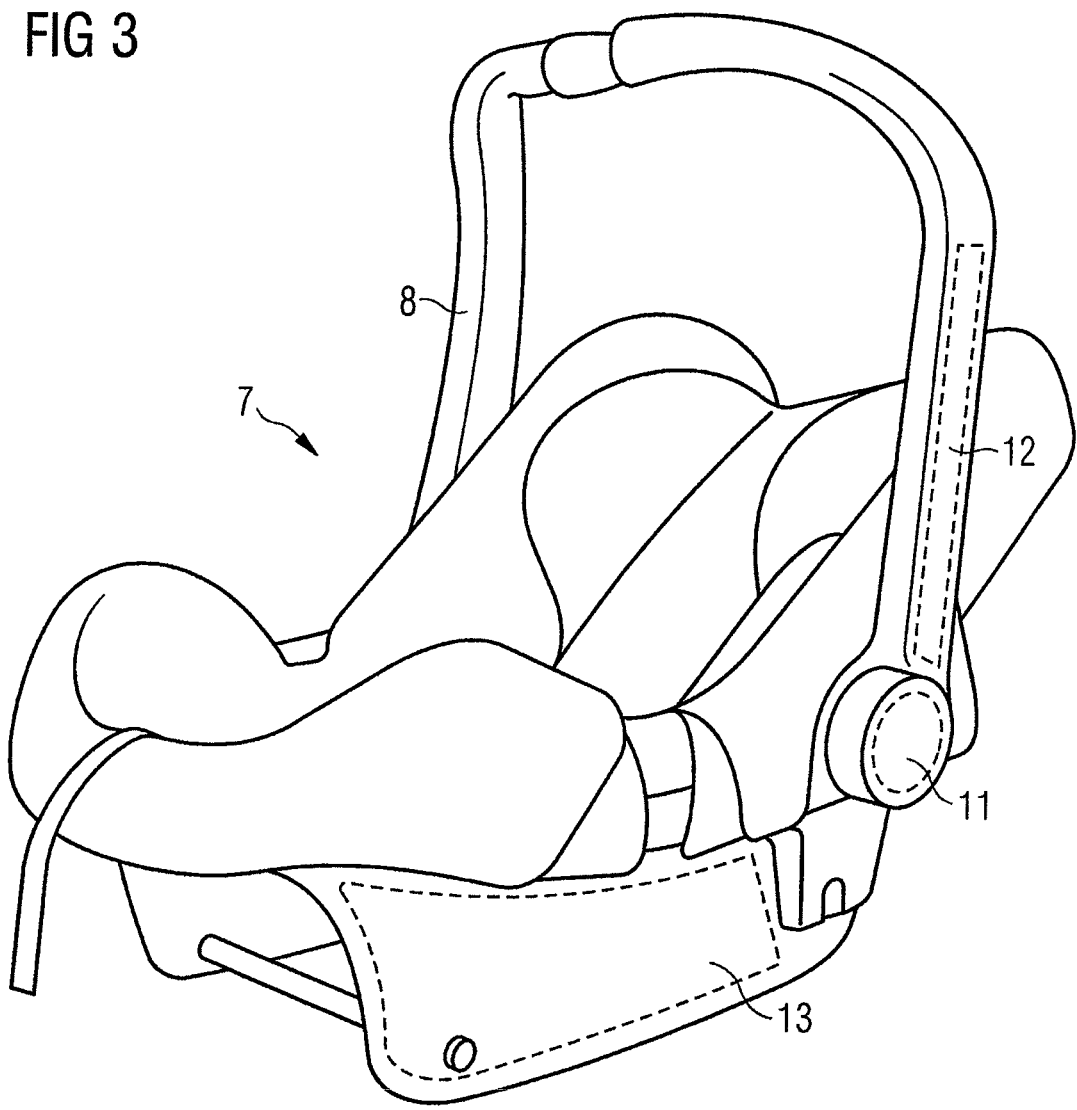
Figure 4:
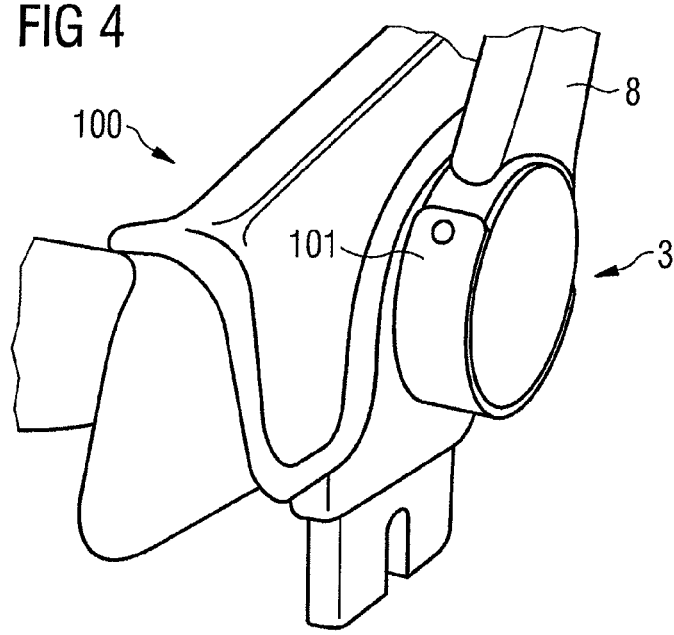
Figure 6:
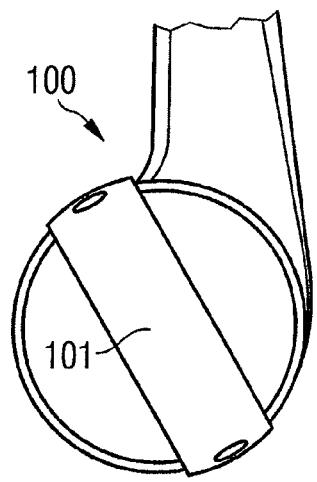
Figure 5:
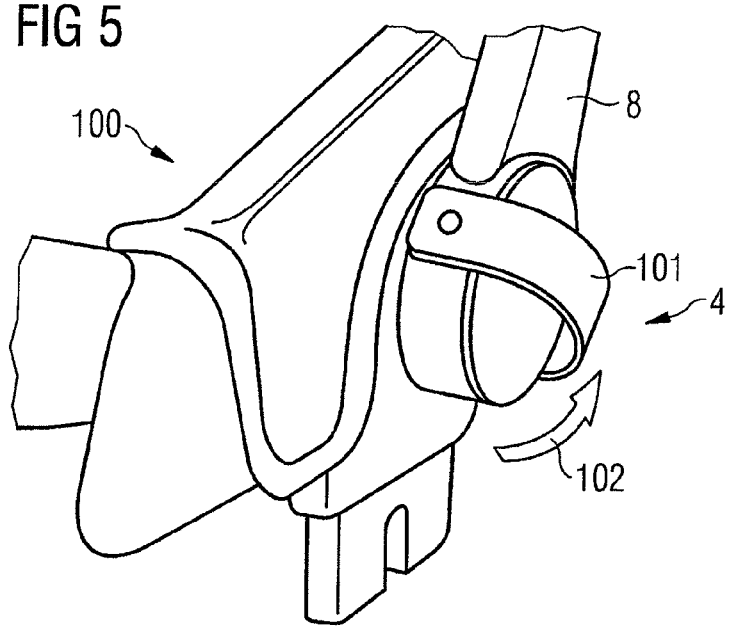
Figure 7:
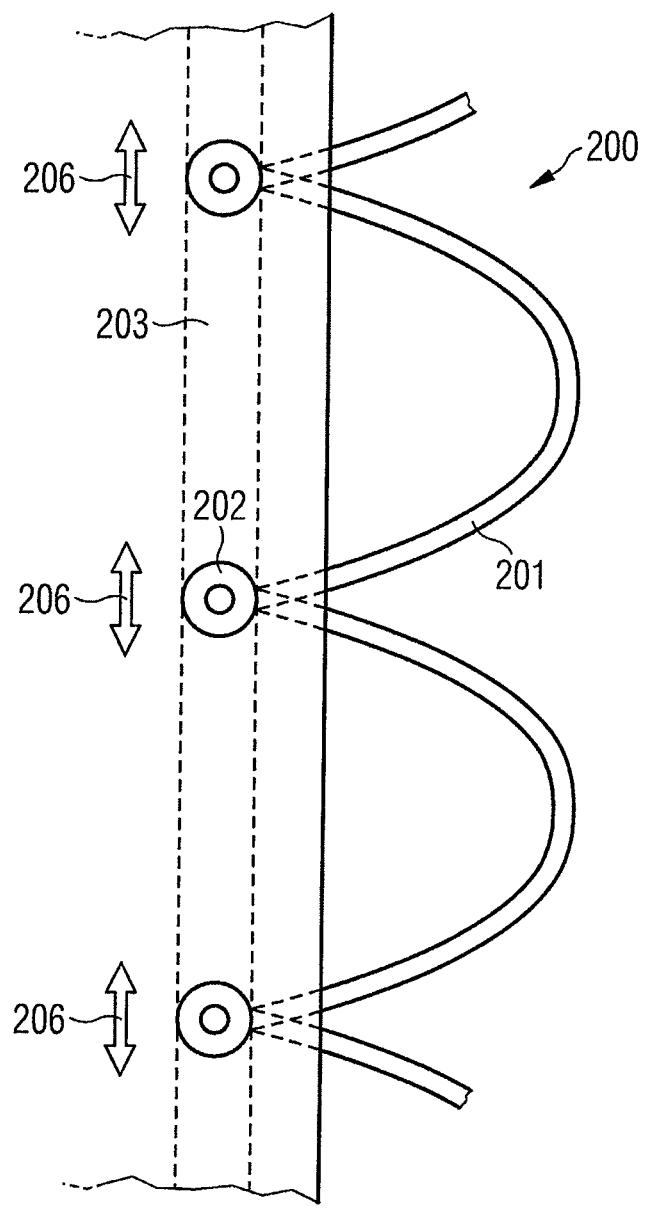
Figure 8:
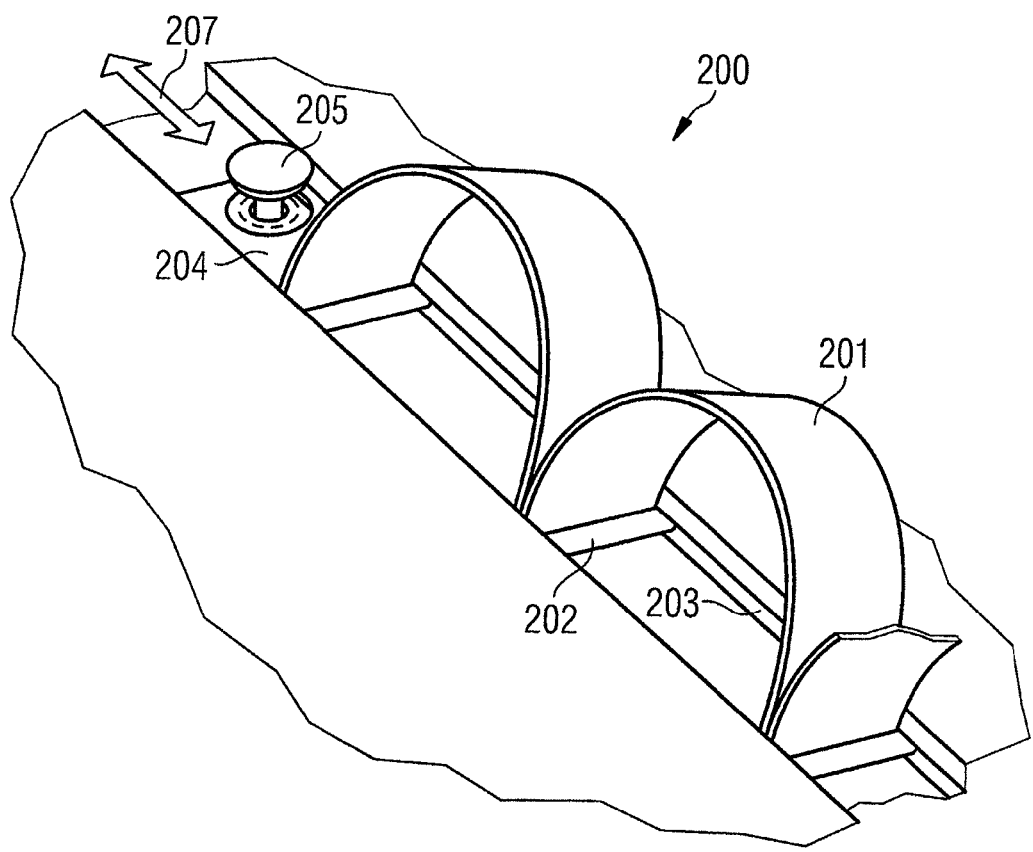
Figure 9:
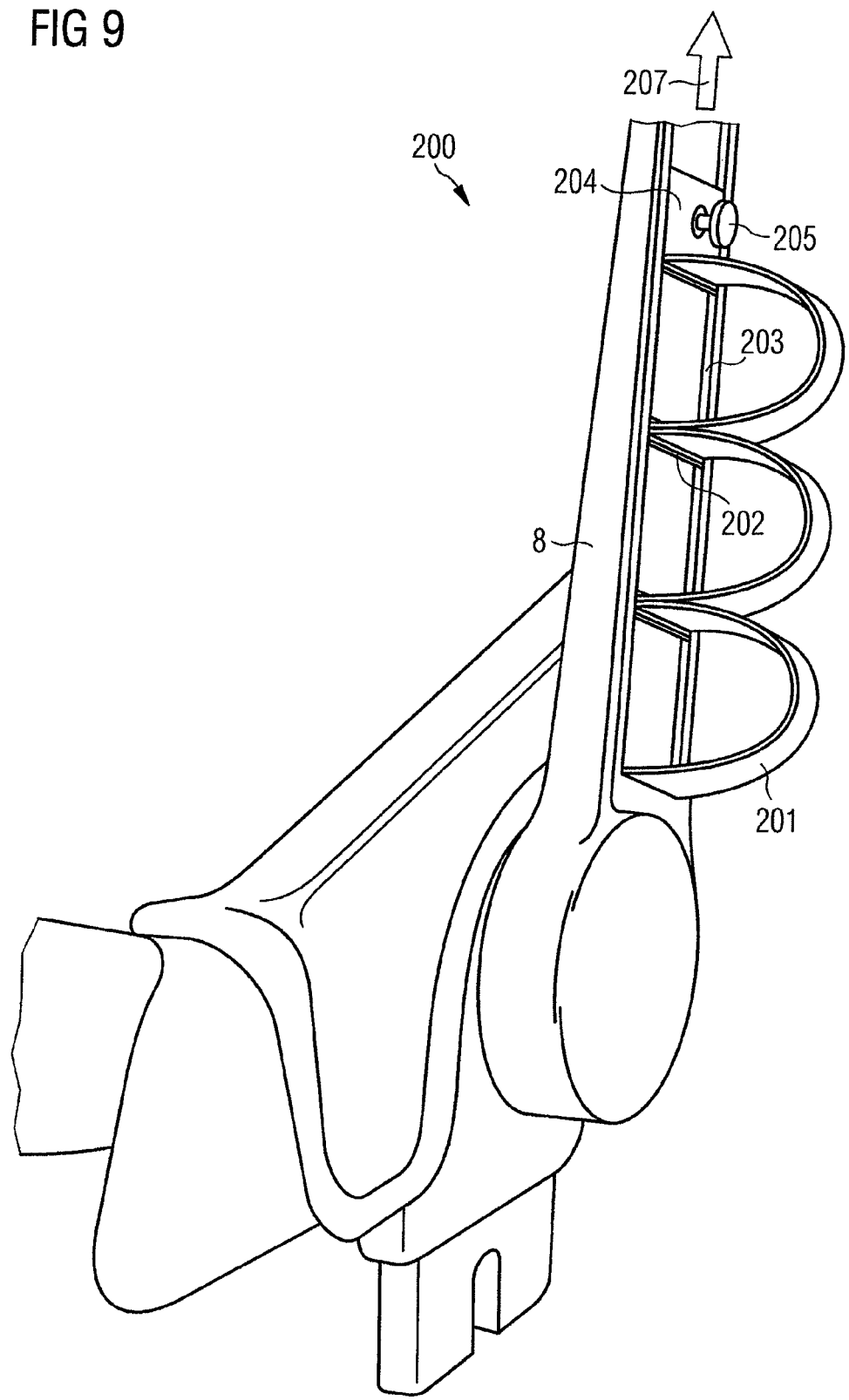
Figure 10:
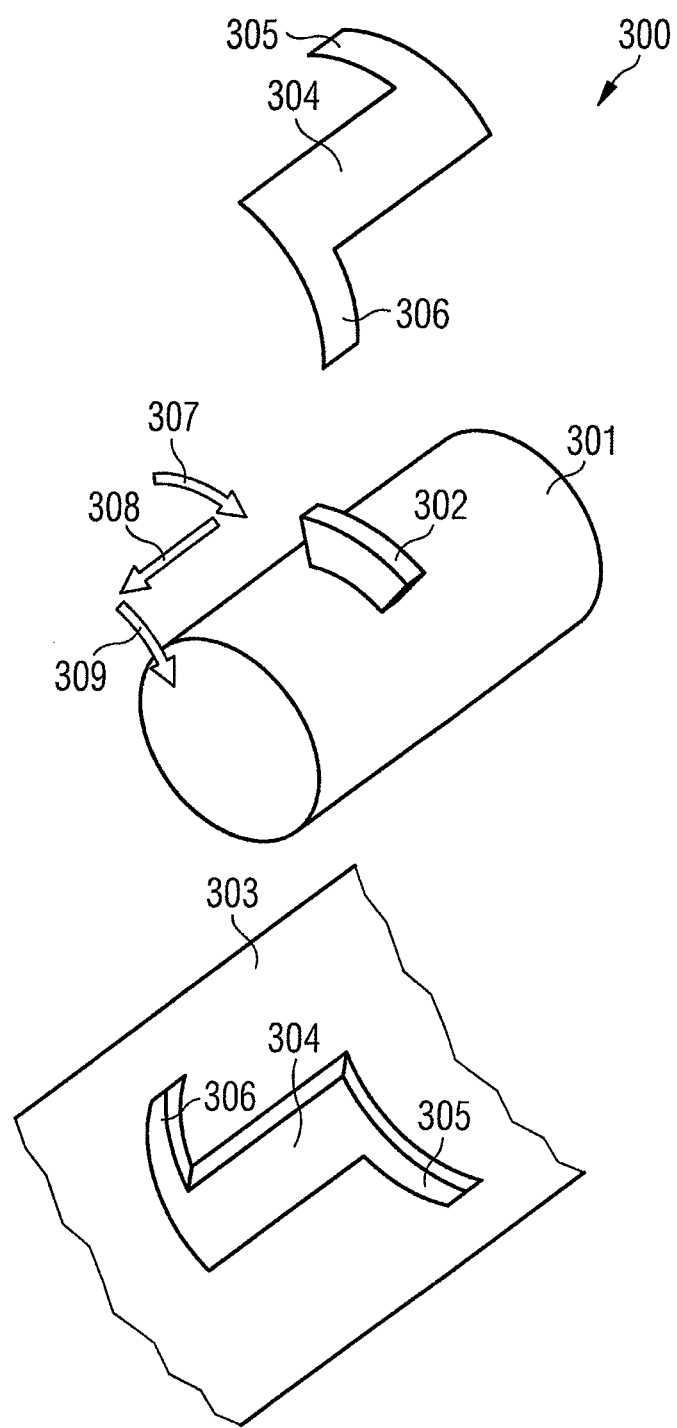
Figure 11:
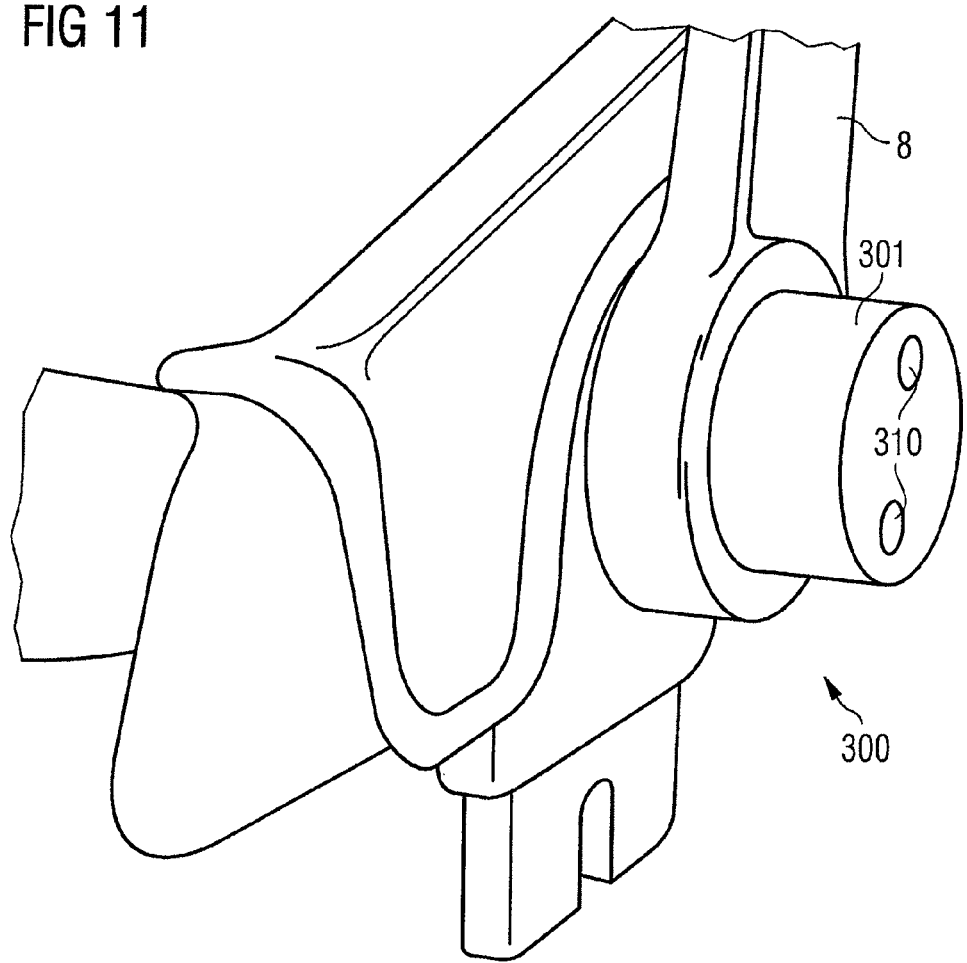

The conceptual operating mode and some preferred embodiments of the present invention will be explained in more detail by means of drawings. There show:

FIG. 1 a child safety seat with side impact protection according to the invention with an element absorbing and/or transmitting energy in rest position;

FIG. 2 a child safety seat with side impact protection according to the invention with an element absorbing and/or transmitting energy in functioning position;

FIG. 3 a child safety seat with regions in which an element absorbing and/or transmitting energy is preferably arranged being emphasised;

FIG. 4 a perspective illustration of a preferred embodiment of the present invention in rest position;

FIG. 5 a perspective illustration of the embodiment of FIG. 4 in functioning position;

FIG. 6 a front view of the embodiment of FIG. 5 in functioning position;

FIG. 7 a schematic illustration of a further preferred embodiment of the present invention;

FIG. 8 a perspective illustration of the embodiment of FIG. 7;

FIG. 9 a perspective illustration of the embodiment of FIG. 8 at the carrying handle of an infant carrier;

FIG. 10 an exploded view of a further preferred embodiment of the present invention;

FIG. 11 a perspective illustration of the embodiment of FIG. 10 at the carrying handle of an infant carrier.

The child safety seat with side impact protection 1 according to the invention as illustrated in FIG. 1 comprises an element absorbing and/or transmitting energy 2 which is in rest position 3. FIG. 2 shows a child safety seat 1 according to the invention with the element absorbing and/or transmitting energy 2 in functioning position 4.

FIG. 3 shows an infant carrier 7 with a carrying handle 8. Dashed lines illustrate regions of the child safety seat in which a mounting of the element absorbing and/or transmitting energy 2 is of particular advantage. These are the fastening region of the carrying handle at the infant carrier 11, the side arm 12 of the carrying handle, and the lower side region 13 of the infant carrier. In the region 13 the carrier material of the infant carrier is not covered by any pads, so that this region is particularly suited to incorporate elements absorbing and/or transmitting energy 2. In regions of the child safety seat which are covered by pads, the positioning of elements absorbing and/or transmitting energy 2 is basically also possible.

FIGS. 4 to 6 show detailed views of the preferred embodiment 100 of the present invention which has already been illustrated in FIGS. 1 and 2. In this embodiment the element absorbing and/or transmitting energy 101 is designed in an arc-shaped manner and is pivotally mounted at the child safety seat. In the rest position 3 shown in FIG. 4, it snuggles to the carrying handle 8 in the region 11. For transfer to the functioning position 4 shown in FIG. 5, it is pivoted about approx. 90° in the direction of the arrow 102, so that it projects in an arc-shaped manner in lateral direction from the region 11. FIG. 6 shows a front view of this element absorbing and/or transmitting energy 101 in the functioning position 4. The element absorbing and/or transmitting energy 101 may be designed such that it is adapted to absorb kinetic energy by deformation. It may, for instance, be designed such that, in the case of a deformation, kinetic energy is converted to heat by inner friction. To this end, a suitable material such as a specific plastic material has to be chosen for the element absorbing and/or transmitting energy 101. According to the invention, the element absorbing and/or transmitting energy 101 may, however, also be designed such that a persistent deformation is basically not possible so as to absorb the laterally impacting energy substantially completely and transmit it to the supporting elements.

FIG. 7 shows a schematic illustration of a further preferred embodiment 200 of the present invention in which the element absorbing and/or transmitting energy is designed in the form of a folding band 201. Here, the child safety seat 1 (not illustrated) comprises guide means 203 in which sliding elements 202 are mounted to which the folding band 201 is fixed. The sliding elements 202 are adapted to be shifted in the direction of the arrows 206. In the rest position 3 (not illustrated) the folding band 201 is stretched and the sliding elements 202 have a maximum distance to each other. For transferring to the functioning position 4 pursuant to FIG. 7, the distance between the sliding elements 202 is shortened, so that the respective regions of the folding band 201 positioned between two sliding elements bend outward from the plane spanned by the guiding means 203.

Advantageously, the folding band 201 is designed such that only one of its ends is shiftable. This end then comprises an end element 204 that is adapted to be locked via locking means 205. FIG. 8 shows a perspective illustration of this embodiment 200. The transfer of the folding band 201 between the rest position 3 and the functioning position 4 is performed via a shifting of the end element 204 in the direction of the arrow 207. By the locking means 205 the folding band 201 can be locked in different positions.

Advantageously, the folding band is arranged in the side region 12 of the carrying handle 8 of an infant carrier 7. This arrangement is illustrated in FIG. 9. The folding band 201 is here in the functioning position 4 and can be transferred to the rest position 3 (not illustrated) by shifting the end element 204 in the direction of the arrow 207.

It may be expedient to replace the sliding elements 202 by rolling elements, so that they do not slide but roll in the guiding means 203. It may also be advantageous to provide distance elements, for instance, at the sliding elements 202 which take care that the sliding elements 202 can be approximated to each other up to a particular pairwise distance only. This distance then defines the functioning position 4, so that it is easier for the user of the child safety seat to adjust it.

In this embodiment 200 kinetic energy may be absorbed, similar to the embodiment 100, by a deformation of the folding band 201, and be converted to heat. It may, however, also be of advantage to design the sliding elements 202 and the locking means 205 such that they can be shifted in the functioning position 4 with increased friction only. The conversion of kinetic energy to heat will then take place less in the folding band 201, but preferably at the sliding elements 202, the guiding means 203, and the locking means 205.

In a further preferred embodiment 300 of the present invention, the element absorbing and/or transmitting energy 2 is substantially cylinder-shaped. FIG. 10 shows an exploded view of such an element absorbing and/or transmitting energy 2. Here, the element absorbing and/or transmitting energy 2 has the shape of a cylinder 301 at which guiding pins 302 are arranged. The cylinder is guided in a cylinder guide 303 comprising recesses 304 in the form of connecting members for the guiding pins 302. In the rest position 3 (not illustrated) the guiding pins 302 are positioned in the rest regions 305 of the recesses 304. By rotating the cylinder 301 in the direction of the arrow 307 the guiding pins 302 are guided out of these regions, so that the cylinder can be shifted in the cylinder guide 303 from the rest position 3 (not illustrated) in the direction of the arrow 308 to the functioning position 4 (not illustrated). Preferably, this shifting 308 is driven by a spring. By a further rotation of the cylinder 301 in the direction of the arrow 309 the guiding pins 302 are taken to the functioning regions 306 of the recesses, so that the element absorbing and/or transmitting energy 2 is anchored in the functioning position 4.

In this embodiment 300 the element absorbing and/or transmitting energy 2 is preferably arranged in the region 11 of an infant carrier 7. This arrangement is illustrated in FIG. 11. The recessed grips 310 facilitate the twisting and shifting of the cylinder 301.

Also in the embodiment 300 kinetic energy can, in analogy to the embodiments 100 and 200, be absorbed and converted to heat by a deformation of the cylinder 301. It may, however, also be expedient to design the cylinder 301 and the guiding pins 302 such that the guiding pins 302 sever from the cylinder 301 during an impact and in so doing kinetic energy is converted to heat.

That which is claimed is:

1. A child safety seat with side impact protection comprising an infant carrier and a carrying handle, the child safety seat comprising:
    at least one energy absorbing element mounted to the carrying handle, wherein the at least one energy absorbing element is configured to be transferred between a rest position and a functioning position, wherein the at least one energy absorbing element is configured to absorb a laterally impacting energy when disposed in the functioning position, wherein the at least one energy absorbing element is configured to project outwardly from the carrying handle when disposed in the functioning position.

2. The child safety seat according to claim 1, wherein said energy absorbing element is arranged in a lower side region of said child safety seat.

3. The child safety seat according to claim 1, wherein said energy absorbing element is pivotally mounted.

4. The child safety seat according to claim 1, wherein said energy absorbing element is designed in an arc-shaped manner.

5. The child safety seat according to claim 1, wherein said energy absorbing element has the shape of a folding band.

6. The child safety seat according to claim 1, wherein said energy absorbing element is designed substantially cylinder-shaped.

7. The child safety seat according to claim 6, wherein the energy absorbing element is configured to be transferred between said rest position and said functioning position via a winding.

8. The child safety seat according to claim 1, wherein said energy absorbing element is configured to be transferred from said rest position to said functioning position manually.

9. The child safety seat according to claim 1, wherein said energy absorbing element is configured to be transferred from said functioning position to said rest position manually.

10. The child safety seat according to claim 1, wherein said energy absorbing element is configured to be automatically transferred from said rest position to said functioning position when said child safety seat is positioned at its destination.

11. The child safety seat according to claim 10, wherein the destination is a seat of a vehicle.

12. The child safety seat according to claim 1, wherein said energy absorbing element is configured to be automatically transferred from said functioning position to said rest position when said child safety seat is removed from its destination.

13. The child safety seat according to claim 1, wherein said energy absorbing element is arranged in a side region of the carrying handle.

14. A child safety seat with side impact protection comprising an infant carrier and a carrying handle, the child safety seat comprising at least one means for absorbing or transmitting energy mounted to the carrying handle, wherein the means for absorbing or transmitting energy is configured to be transferred between a rest position and a functioning position and configured to absorb a laterally impacting energy when disposed in the functioning position, wherein the means for absorbing or transmitting energy is configured to project outwardly from the carrying handle when disposed in the functioning position.

15. The child safety seat according to claim 14, wherein said means for absorbing or transmitting energy is automatically transferred from said functioning position to said rest position when said child safety seat is positioned at its destination.

16. The child safety seat according to claim 14, wherein said means for absorbing or transmitting energy is arranged in a side region of the carrying handle.

17. A child safety seat with side impact protection comprising at least one energy absorbing element configured to be transferred between a rest position and a functioning position, wherein the energy absorbing element is configured to absorb a laterally impacting energy when disposed in the functioning position, wherein said energy absorbing element is configured to automatically transfer from said rest position to said functioning position when said child safety seat is positioned at one of a vehicle seat or a base of the child safety seat.

18. The child safety seat according to claim 17, wherein the child safety seat is an infant carrier with a carrying handle, and wherein the enemy absorbing element is mounted to said carrying handle.

19. The child safety seat according to claim 18, wherein said energy absorbing element is arranged in a side region of the carrying handle.

* * * * *

UNITED STATES PATENT AND TRADEMARK OFFICE
CERTIFICATE OF CORRECTION

PATENT NO. : 8,449,030 B2  
APPLICATION NO. : 12/829109  
DATED : May 28, 2013  
INVENTOR(S) : Powell et al.

Page 1 of 1

It is certified that error appears in the above-identified patent and that said Letters Patent is hereby corrected as shown below:

In the Claims

Column 8,
Line 49, Claim 18, "wherein the enemy absorbing" should read --wherein the energy absorbing--.

Signed and Sealed this
Third Day of September, 2013

Teresa Stanek Rea
*Acting Director of the United States Patent and Trademark Office*